United States Patent [19]
Levens

[11] 3,950,461
[45] Apr. 13, 1976

[54] PIPE REPAIR APPARATUS AND METHOD
[75] Inventor: Joseph A. Levens, Richardson, Tex.
[73] Assignee: Nipak, Inc., Dallas, Tex.
[22] Filed: May 31, 1974
[21] Appl. No.: 474,922

[52] U.S. Cl. .............. 264/46.5; 138/97; 264/46.6; 264/46.9; 264/155
[51] Int. Cl.² ........................................ B29D 27/04
[58] Field of Search ........ 264/46.6, 46.9, 155, 46.5; 138/97

[56] References Cited
UNITED STATES PATENTS

| | | | |
|---|---|---|---|
| 2,522,171 | 9/1950 | Furman et al. | 138/97 X |
| 3,340,336 | 9/1967 | Bender | 138/97 X |
| 3,444,279 | 5/1969 | Dost | 264/46.9 X |
| 3,498,838 | 3/1970 | Scott | 264/46.6 X |
| 3,710,812 | 1/1973 | Wise | 138/97 X |
| 3,753,766 | 8/1973 | Brown et al. | 138/97 X |

OTHER PUBLICATIONS
Nipak Bulletin, "Sewer Renewal by Insertion with Nipak Polyethylene Pipe," Dallas, Tex., Nipak, [by 5/9/73 or earlier].
St. Onge, H. S., "Updating Aging Sewers without Trenching," in *Engineering and Contract Record*, July 1974, pp. 40–44.

*Primary Examiner*—Philip Anderson
*Attorney, Agent, or Firm*—Richards, Harris & Medlock

[57] ABSTRACT
Disclosed is a method and apparatus for repairing a buried main having connected lateral service conduits. In the method, a main is opened and cleaned of debris. Thereafter, an elongated conduit liner is axially inserted into a length of the buried main. The lateral service conduits are opened and cleaned from a point remote from their connection to the main. A dispenser is axially inserted through the service conduit to a point adjacent to the connection. At the connection, polyurethane material is dispensed into a portion of the service conduit and in the annular space between the main and the liner. Thereafter, the dispenser means is removed from the service conduit and the polyurethane material is allowed to set. A cutter apparatus is axially inserted into the service conduit and is manipulated to form a port through the polyurethane material and the wall of the liner to connect the service conduit to the liner. Thereafter, a sealer material may be applied to the exposed polyurethane in the area of the connection. In an alternative configuration, a conduit liner is axially inserted into the service conduit to abut the liner of the main. Thereafter, polyurethane sealant material is injected into the interior of the service conduit liner at a point adjacent to the liner of the main. The polyurethane material exits the service conduit liner through ports formed therein and fills the annular space between the service liner and the service conduit and the annular space between the liner of the main and the main. Thereafter, a cutter is axially inserted into the liner of the service conduit and is manipulated to form a port through the polyurethane in the service conduit liner and through the wall of the liner in the main to form a sealed connection.

11 Claims, 9 Drawing Figures

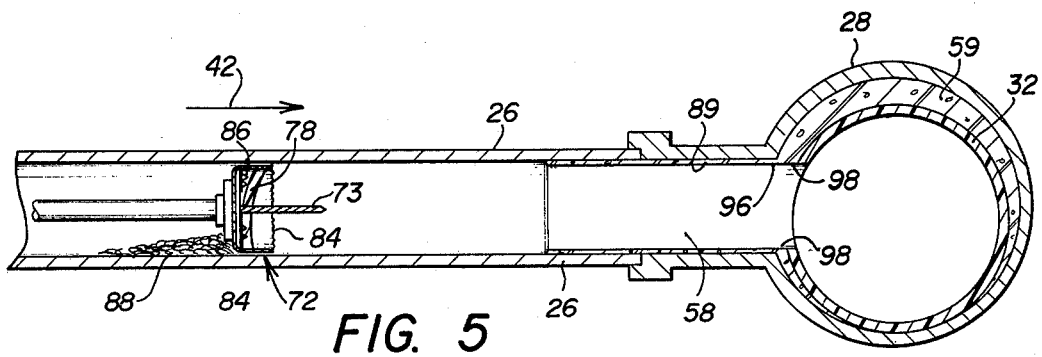
FIG. 5
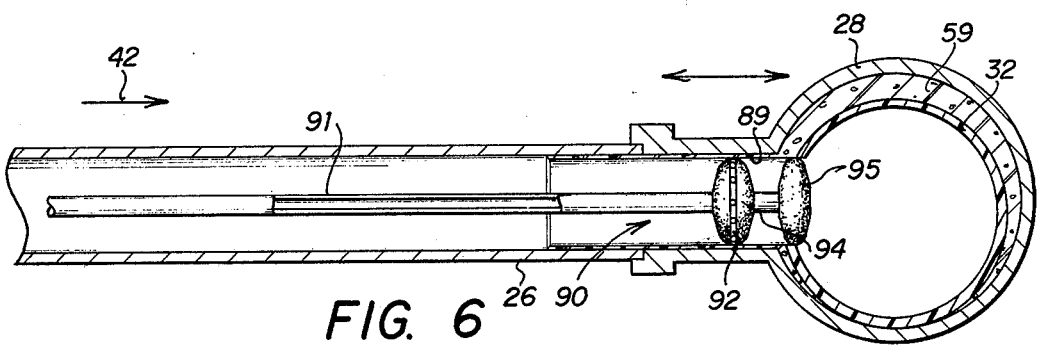
FIG. 6
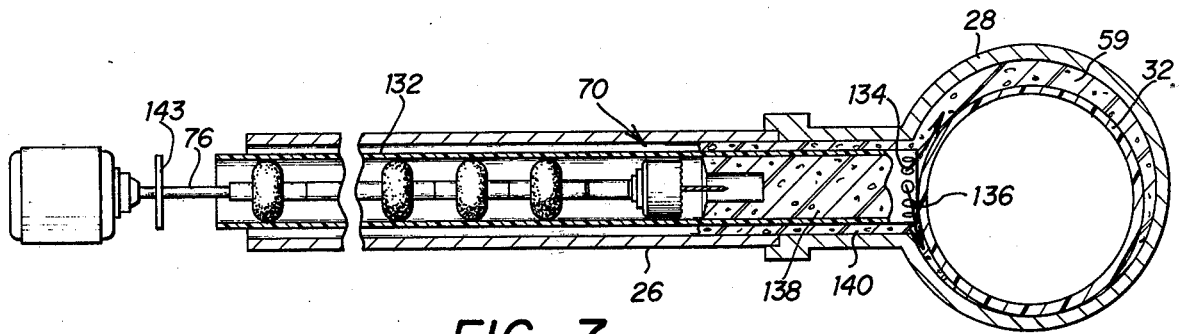
FIG. 7
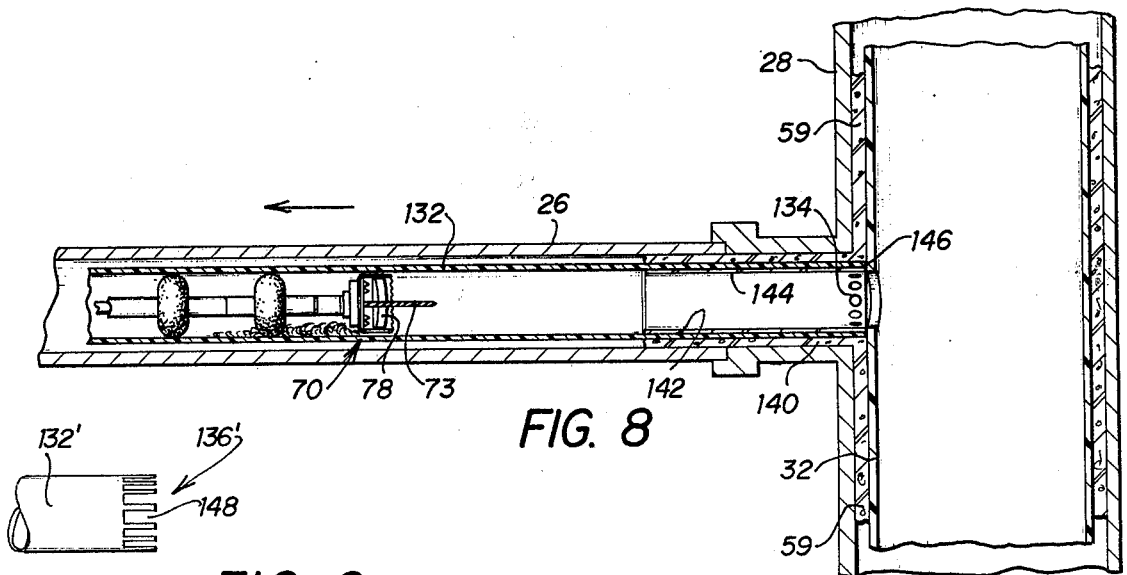
FIG. 8
FIG. 9

PIPE REPAIR APPARATUS AND METHOD

BACKGROUND OF THE INVENTION

The present invention relates to the repair and reconditioning of buried conduits, such as sewage lines, drainage lines, and the like. More particularly, the present invention relates to the repair and reconditioning from a remote location of buried conduit systems having branching connections between conduits.

In the past, it has been common to use masonry and clay conduits buried in the ground to construct sewage systems, drainage systems, and the like. Although these buried conduits have been quite satisfactory for their purpose, it has been found that over a period of time, these conduit systems can deteriorate or become damaged. This deterioration can be as a result of many causes such as, root action, soil movement, deterioration of the pipe material, and the like. The conventional method of repairing buried conduit systems is to completely excavate the system and repair the damaged portions thereof. The disadvantage of this conventional repair method is apparent when it is considered that the systems are commonly positioned under a street or roadway, and are buried in the ground from 6 to 30 feet. Thus, substantial expenses can be involved in excavation and repair under these conditions.

In addition, when the systems are located below roadways and other structures, excavation requires that these structures be disturbed and repaired. In addition, this method can require substantial periods of time, and during this time, use of the sewage system and the roadways is prevented.

To overcome the disadvantages of the excavation method of repairing and reconstructing buried conduits, a method wherein a flexible liner of suitable material is axially inserted into the main from a convenient access point has been used. In this method, a liner can be pushed through a length of the main to another point where the access to the main is convenient spanning distances up to 1500 ft. In some situations, convenient access to the main can be obtained at existing manholes, or the like. In other situations, excavation at spaced locations along the length of a sewage main is required. Once access is obtained, the main is cleaned and lengths of polyethylene liner can be axially inserted into the main.

This method of inserting a liner has been found to be quite satisfactory in repairing sections of main which do not have lateral service conduits connected thereto, but has been undesirable in repairing systems where a plurality of service access conduits are connected to and extend from the central main. This is a result of the fact that heretofore, there was no satisfactory method for connecting a service conduit to a main at a remote buried location without additional excavation at the connection of the service conduit to the main.

Therefore, a great need exists for a method and apparatus of interconnecting and sealing two conduits of a system at a remote buried location without excavation at the intersection.

In addition, it is desirable that the connections be made at a distance of at least 25 feet from the main to eliminate the necessity of excavating the roadway. It is important that the resulting connection be leakproof to prevent both infiltration and exfiltration of the system. The method and apparatus must be able to work in a dirty, wet environment of systems such as an active sewer without requiring substantial excavation of or interference with the use of the roadway. It is desirable that the method be easy to practice and it is preferable that it be usable in situations where the lateral service conduit is relined or when the lateral is not relined. The required equipment must be portable and adaptable to a wide variety of situations.

Therefore, according to one aspect of the present invention, an improved method for forming a sealed connection between two conduits at a remote buried location is provided which can be performed without the necessity of excavation in the area of the connection. According to another aspect of the present invention, improved apparatus are provided for use in forming a sealed connection between two conduits at a buried remote location.

More particularly, according to the present invention, an improved method and apparatus is provided for repairing a conduit system, such as a sewer system, having a buried main and at least one branching service conduit connected to the main. According to the improved method, access is gained to the buried main at spaced locations which are remote from the intersection of the service line and the main. The service line is also opened at a spaced location. Thereafter, the main and service line are cleaned. A length of polyethylene liner is axially inserted into the main through the area of the connection with the lateral service conduit. Thereafter, an improved dispenser is axially inserted through the length of the service conduit to a point adjacent to the main. A foamable setting resinous material, preferably a foamable setting synthetic polymer and more preferably a foamable thermosetting plastic is dispensed in the annulus formed between the liner and the main in the area of intersection with the service conduit. Materials which are preferred in the practice of the present invention include polyurethane foams, acrylamide foams and elastomer foams with the particular preferred material being polyurethane foams.

An improved cutter is axially moved through the length of the service conduit to form a port through the resinous material and the wall of the liner to connect the service conduit and the liner of the main. Thereafter, a sealing material can be dispensed in the area of the connection to coat the resinous material. Thus, a sealed interconnection is provided.

In another embodiment, the service conduit is also lined with a polyethylene conduit. The annular spaces between the liners and the respective service conduit and main is filled with a foamable setting resin in the area of intersection. Thereafter, a port is formed in the above-described manner to form a sealed connection between the two lines.

The advantages and features of the improved method and apparatus of the present invention will be more readily appreciated by those of ordinary skill in the art as disclosure thereof is made in the following description by reference to the accompanying Drawings in which:

BRIEF DESCRIPTION OF THE DRAWINGS

FIG. 5 is a view similar to FIG. 4 of the connection after the cutter has removed the material therefrom;

FIG. 6 is a view similar to FIG. 5 illustrating the improved sealer dispenser dispensing a sealing material onto the exposed resinous material;

FIG. 7 is a view similar to FIG. 4 of an alternate embodiment of the present invention illustrating the use of a liner in the lateral service conduit;

FIG. 8 is a horizontal section of the embodiment illustrated in FIG. 7 with a port connecting the two liners; and FIG. 9 is an alternate embodiment of the end structure of a liner for the service conduit.

DESCRIPTION OF THE PREFERRED EMBODIMENTS

Figure 1:
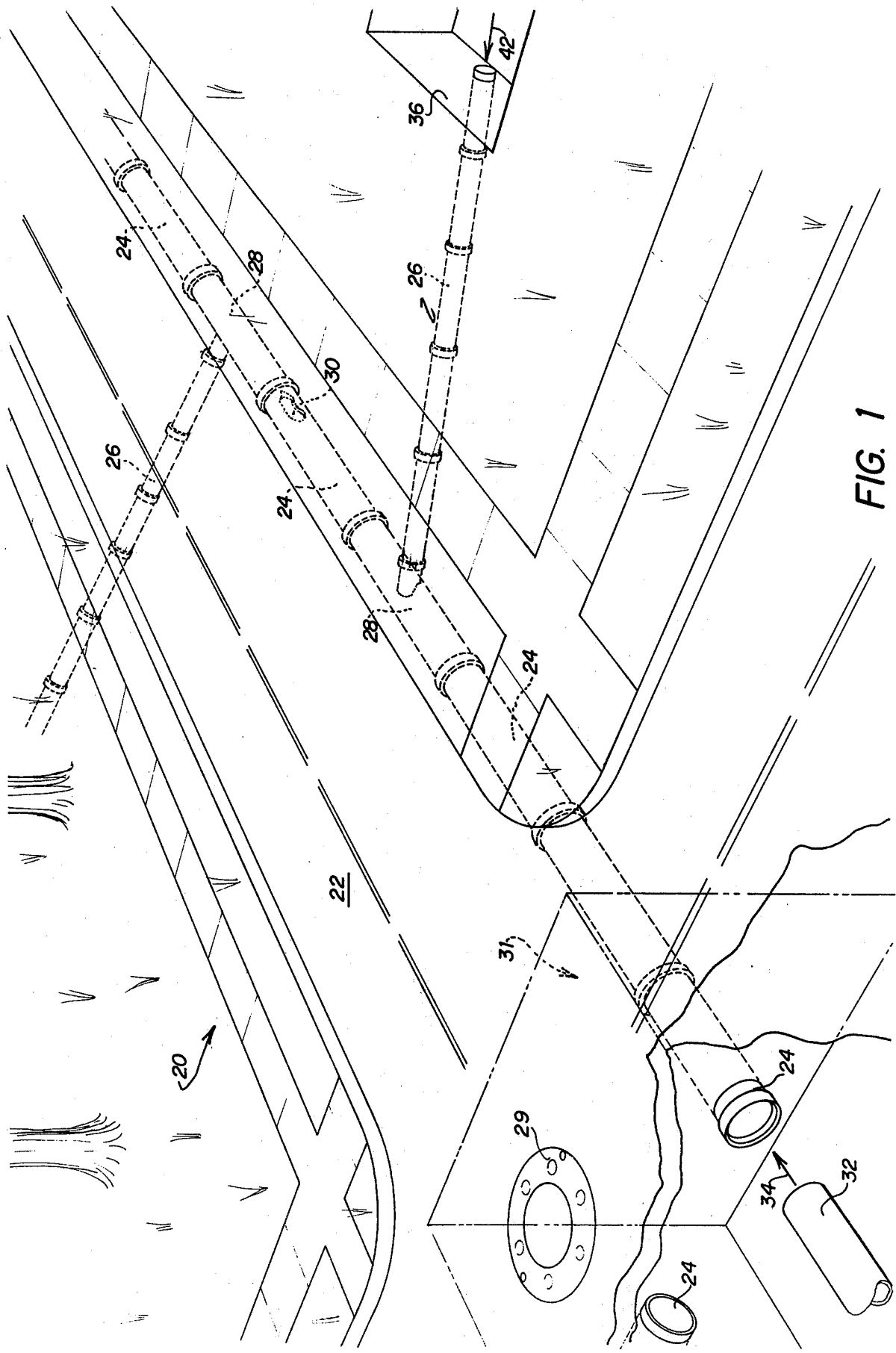
FIG. 1 is a perspective view of a conventional main buried under a roadway with branching transverse service conduits connected thereto.

Referring now to the Drawings wherein like reference characters designate like or corresponding parts throughout the several views, there is illustrated in FIG. 1 a conventional sewage system which for purposes of description is identified by reference numeral 20. The sewage system 20 is shown buried in the ground beneath a roadway 22. The sewage system 20 has a main 24 which is located under the roadway 22 and are normally 6 to 60 inches in diameter. The main conduit 24 has a slope of about 2 feet every thousand feet and can vary in depth in the ground from 6 to 20 feet. Conventionally, the main 24 is constructed from a plurality of sections of clay or masonry pipe grouted together as illustrated.

Lateral branching service conduits 26 are illustrated extended from the main 24. Each conduit 26 is connected to the main 24 by a "T" section 28. These service conduits 26 are normally 4 to 8 inches in diameter and can be constructed from the same material as the main 24. It is to be understood, of course, that in a normal sewage or drainage system, a plurality of lateral service conduits 26 can extend from the main conduit 24 at locations spaced along the length thereof. These service conduits 26 normally extend from under the roadway 22 to connect residences and commercial establishments to the system.

The repair and service of the main 24 and the lateral service conduits 26, if conventionally performed, can require extensive excavation of the roadway 22 and disruption of the use of the roadway 22 and system 20. For purposes of illustration, a deterioration or leak 30 is located in the sewage system 20 under the roadway 22.

To practice the improved method of the present invention, access to the main 24 is accomplished through a manhole 29 providing an access space 31 as shown in FIG. 1. For convenience, the access space 31 is shown at an intersection providing access to mains 24 under the various roads of the intersection. At a point located away from the space 31 (not shown), the main 24 is similarly opened. A typical situation would allow access to the main 24 at the next intersection or even further along the roadway.

Next, the main 24 is cleaned of roots and other debris by conventional methods well known in the art. Thereafter, a liner 32 of a suitable material, such as polyvinyl chloride, polybutylene, polypropylene, polyethylene, or the like, is axially inserted into the main 24 in the direction of arrow 34. The liner 32 is of sufficient length to span the distance between the two access openings for the main. It is also to be understood that the liner 32 extends through the T sections 28 and the area of the leak 30. In the past, liners have been used to span distances up to 1500 feet in length. It is envisioned, of course, that greater lengths could be spanned, if desired.

The service conduit 26 is next opened at a convenient point. In the present embodiment, the conduit 26 is excavated at a point 36 spaced away from the roadway 22 and preferably at a point where conduit 26 is at a minimum depth. This excavation 36 can be spaced 25 ft. or more away from the main 24. In a conventional manner, the service conduit 26 is cleaned of debris. It is also envisioned that the service conduit 26 could be cleaned prior to the insertion of liner 32.

Figure 2:
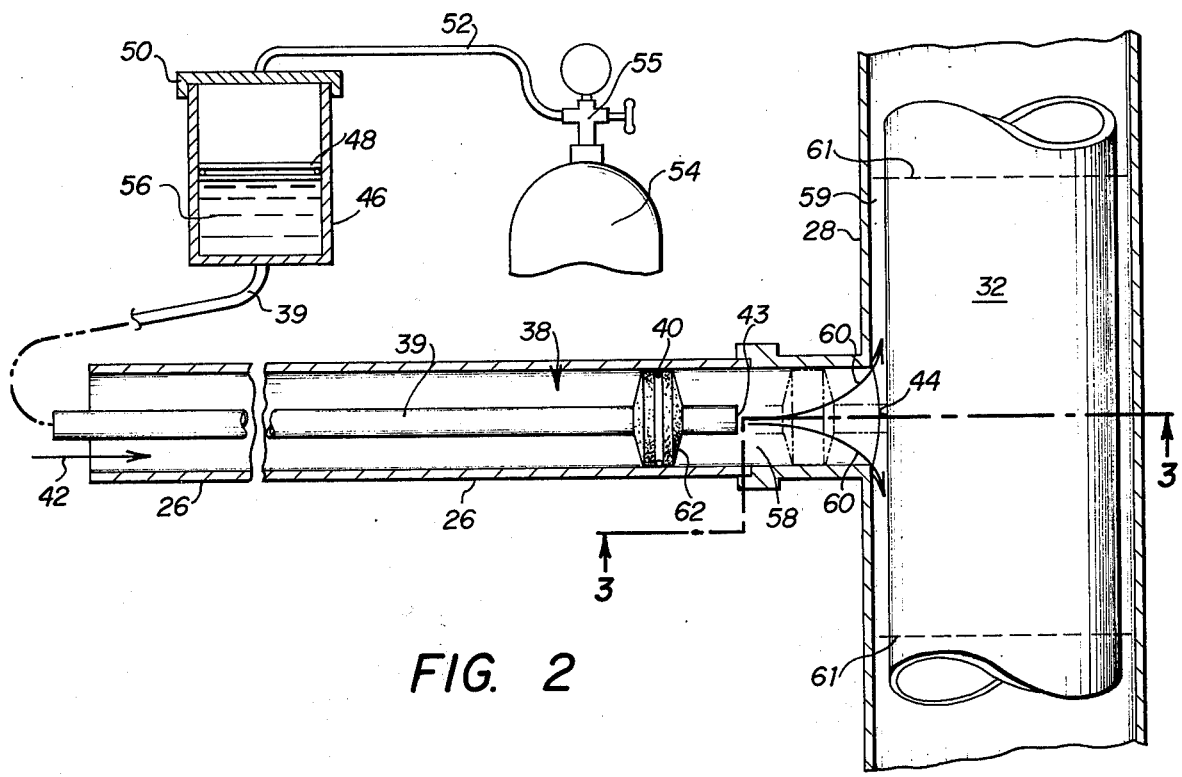
FIG. 2 is a horizontal section of the buried main at an intersection with a service conduit showing a liner in place in the main and the improved dispenser of the present invention in the service conduit.

According to an improved feature of the present invention, the lateral service conduit 26 is connected to the liner 32 without excavation of the T section 28. As illustrated in FIG. 2, the first step of the improved method involves axially inserting a flexible dispensing assembly 38 into the open end of the lateral service conduit 26 in the direction of arrow 42. The assembly 38 is sufficiently flexible to allow insertion along the length of the conduit 26. The assembly 38 has an elongated flexible conduit 39 with a seal 40 mounted thereon near the end 43. The seal 40 can be of any suitable construction which conforms with the interior of conduit 26. It is envisioned that the seal 40 could be of the expandable or inflatable type which can be operated to seal against the interior wall of conduit 26 once the dispenser assembly 38 is in position. The end 43 is open to dispense material into conduit 26 from conduit 39.

When positioning the assembly 38, the conduit 39 is first inserted in the open end of conduit 26 until the end 43 of the assembly 38 contacts the wall of the liner 32 at 44, as shown in dotted lines in FIG. 2. Next, the assembly 38 is moved a set distance in the reverse direction of arrow 42 to a desired position. The seal 40 can then be actuated.

The external end of conduit 39 is connected to the lower portion of a cylinder 46. A piston 48 divides the cylinder into upper and lower variable volume chambers. The piston 48 is free to axially reciprocate in the cylinder 46 in sliding sealing engagement with the walls thereof.

The upper end of the cylinder 46 is closed by a removably attached cap 50. Cap 50 can have suitable means such as threads to allow removal. A conduit 52 connects the upper chamber of the cylinder 46 with a source of pressurized gas 54. A valve 55 is provided to regulate the flow of pressurized gas into the upper chamber of the cylinder 46.

Once the end 43 is in the desired position, the cap 50 and piston 48 are removed from cylinder 46. A settable foaming resinous sealant material 56 is mixed and placed in the lower chamber of the cylinder 46. The resinous sealant material 56 is preferably a foamable setting synthetic polymer and more preferably a foamable thermosetting plastic. The sealant material should be foamable and expand upon application to form a compression fit as hereinafter described. It must be nonsoluble as well as resistant to attack from the fluids in which it is used. Materials which are preferred in the practice of the present invention include polyurethane foams, acrylamide foams and elastomer foams with the particular preferred material being polyurethane foams.

Figure 3:
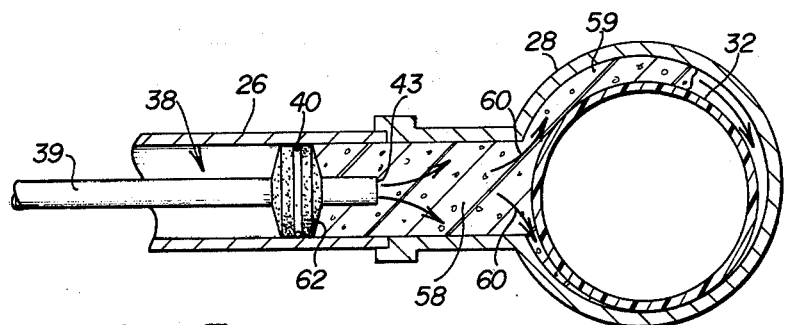
FIG. 3 is a vertical section of the buried main taken on line 3—3 of FIG. 2, looking in the direction of the arrows.

Piston 48 is placed in the cylinder 46 and the cap 50 is attached. Thereafter, the valve 55 is manipulated to release pressurized gas into the upper portion of the cylinder 46 to force the resinous material 56 to flow through the conduit 39 and to be dispensed from the end 43. The dispensed material 56 will fill the conduit 26 in the area 58 and will flow in the direction of arrows 60, as shown in FIGS. 2 and 3, into the annular space 59 formed between the liner 32 and fitting 28. This process continues until material 56 occupies the annular space 59 in the area of the intersection of the service conduit and the main 24. Dotted lines 61 represent the approximate area which is eventually occupied by the resinous material. It is to be understood, of course, that the material 56 will foam and expand into the areas 58 and 59 causing a compression fit between liner 32 and fitting 28. The resinous material is allowed to set, thus surrounding and sealing the lateral conduit 26 from the main 24. It is also important to note that one face 62 of the seal 40 is tapered to form an inclined annular shoulder 64 on the end of area 58. This shoulder 64 assists in preventing flow blockage at this point.

After the resinous material is set, the dispenser 38 is pulled from the lateral service conduit 26 and a cutter assembly 70 is axially inserted into conduit 26 in the direction of arrow 42. This cutter assembly 70 has a cutting head 72 with a leading bit 73. The head 72 is driven by a flexible shaft 76. The shaft 76 is driven by a remote power means located at the excavation 36. Centering elements 74 can be provided for the shaft 76 to position the head 72 within the conduit 26. These centering elements 74 each have a short length of tubing 80 and an axially extending portion 82 for contacting the interior walls of conduit 26 to center the shaft 76 and head 72.

The head 72 has a cylindrical sawtooth blade 84 which defines the periphery of the port formed by head 72. Shredding teeth 86 are positioned within the blade 84 to shred the resinous material captured therein during the cutting process.

Figure 4:
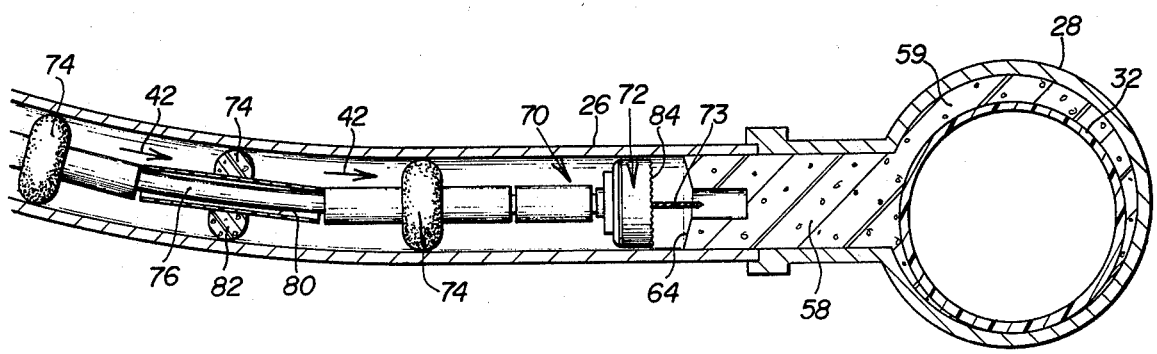
FIG. 4 is a view similar to FIG. 3 illustrating the improved cutter of the present invention in the service conduit.

To connect the service conduit 26 to the liner 32, the cutter assembly 70 is axially inserted into conduit 26 in the direction of arrow 42 as shown in FIG. 4. This insertion of assembly 70 is continued until the head 72 begins to cut into the resinous material in area 58.

As the head 72 cuts into area 58, the blade 84 will form the wall of a port 89. The centering structure 74 will insure correct positioning of the head 72 while the blades 86 will shred the resinous material in the port 89. Movement of the head 72 in the direction of arrow 42 is continued until a coupon 78 is cut from the wall of liner 32 and retained in head 72. The cutter assembly 70 is removed from conduit 26 as shown in FIG. 5, thus removing the coupon 78 and shredded resinous material 88.

The port 89 is illustrated in FIGS. 5 and 6 and has an annular wall 96 in the area 58. This is due to the fact that the blade 84 is slightly smaller than the interior diameter of conduit 26. In addition, the resinous material fills the space 98 between the liner 32 and conduit 26. Thus, a sealed connection is formed between conduit 26 and liner 32, without excavating the area of connection.

A suitable sealing material may be applied to the walls of port 89. This may be accomplished by using a dispenser swab assembly 90. This assembly 90 has an elongated conduit 91 which is used to position a dispenser 94 in conduit 26 and to convey sealing material thereto. The dispenser 94 has a plurality of openings 92 spaced about the periphery thereof. Thus, the sealing material can be dispensed through openings 92 onto the walls of port 89. A plug 95 can be provided to prevent any excess sealing material from entering the liner 32.

An alternate embodiment of the present invention is illustrated in FIGS. 7 through 8. In this embodiment, the improved process of the present invention is practiced with the additional step of relining the lateral service conduit 26. As illustrated in FIG. 7, a liner 132 is inserted into lateral service conduit 26. The liner 132 is inserted in the manner similar to the liner 32 by axially pushing the liner into conduit 26 in the direction of arrow 42. It is important to note that the liner 32 is provided with a plurality of ports 134 adjacent to end 136. These ports 134 allow the free flow of the foamable setting resinous material when it is injected into the liner 132 as will be hereinafter described. The liner 132 is inserted into the service conduit 26 until the end 136 contacts liner 32.

Thereafter, the dispensing assembly 38, previously described, is inserted into the liner 132. The seal is then actuated and resinous material is dispensed into the area 138 within the end of liner 132. The resinous material also flows through the ports 134 and into the annular area 140 defined between the conduit 26 and liner 132 and also into the annular space 59.

Once the dispensing process is complete, the dispenser can be removed from the liner 132 allowing the resinous material to set. Thereafter, cutter assembly 70 can be inserted into the liner 132 as shown in FIG. 7. The cutter is manipulated to form a port 142 through the area 138 and the wall of the liner 32. If desirable, a stop 143 can be fixed on the shaft 76 to limit the axial extension into the liner 32. This port 142 connects liner 132 and liner 32. As shown in FIG. 8, the resinous material in area 138 will form a cylincrical wall 144 within the liner 132 and will seal the space 146 adjacent the intersection of the two liners. Thus, a sealed interconnection is made between a relined service conduit and relined main.

It is also envisioned that the previously disclosed sealing step can be performed in the embodiment illustrated in FIGS. 7 and 8.

An alternate embodiment of the service conduit liner is illustrated in FIG. 9. This liner 132' has slots 148 formed at the end 136' to allow the flow of resinous material from the interior of the liner 132 to the exterior thereof during the sealing and joining process. It is also envisioned that other shapes could be used.

Thus, the present invention teaches an improved method and apparatus which allows the connection of buried conduits without the necessity of excavation in the area of the connection. It is apparent that this process could be repeated as required throughout the system 20 with excavation being required only for gaining access to the service conduits. It is also apparent that the improved method of the present invention could be used to repair systems having various types and shapes of fittings therein.

It is to be understood, of course, that the foregoing disclosure relates only to preferred embodiments of the present invention and that numerous alterations and modifications can be made therein by those of ordinary skill in the art without departing from the spirit and scope of the invention as set forth in the appended claims.

What is claimed is:

1. In a method of remotely connecting subsurface intersecting service and main conduits without excavating the intersection, having the steps of:
   opening the service and main conduits at points remote from the intersection;
   axially inserting a main conduit into an elongated cavity to extend through the area of intersection with said service conduit;
   filling the space between said main conduit and said cavity adjacent to the area of intersection of said service and main conduits with a sealant material;
   forming a port extending through the wall of said main conduit whereby said service conduit is connected to said main conduit;
   the improvement wherein said filling step comprises:
   inserting a dispenser through said service conduit to a point adjacent to the area of intersection of said service and main conduits;
   inserting a seal through said service conduit to a point adjacent to said dispenser to prevent flow through said service conduit in a direction from said dispenser and away from said main conduit; and dispensing said sealant material from said dispenser into the space between said main conduit and said cavity adjacent the area of intersection of said service and main conduits.

2. The method of claim 1 wherein the improvement further comprises the port forming step including:
   inserting into said service conduit a cutting tool on the end of a shaft;
   centering said shaft within said service conduit;
   rotating said shaft thereby rotating said cutting tool; and
   axially reciprocating said shaft and cutting tool in said service conduit thereby cutting a port through said sealant material and the wall of said main liner.

3. The method of claim 2 additionally comprising coating the walls of said port with a protective material.

4. The method of claim 1 wherein the filling step includes:
   filling the space between said main conduit and said cavity with polyurethane foam.

5. The method of claim 4 and further comprising:
   allowing said polyurethane foam to harden thereby forming a seal between said main conduit and said cavity adjacent the area of intersection of said service and main conduits.

6. The method of claim 1 additionally comprising coating the walls of said port with a protective material.

7. A method of relining a subsurface main and forming a connection with a subsurface service conduit without excavating the connection, comprising:
   opening said subsurface main conduit at two points spaced along the length of said main conduit;
   inserting a conduit liner into said main at one of said openings;
   drawing said conduit liner through said main conduit to the other of said openings;
   opening said subsurface service conduit at a point remote from the intersection of said main conduit and said service conduit;
   inserting a service conduit liner into the opening of said service conduit to a point adjacent the area of intersection of said main conduit and said service conduit;
   inserting a dispenser through said service conduit liner to a point adjacent the area of intersection of said main conduit and said service conduit;
   dispensing a foamable thermosetting plastic from said dispenser to fill the space between said main conduit and said main conduit liner adjacent the area of intersection of said main conduit and said service conduit and to fill the space between the end of said service conduit liner and said main conduit liner;
   inserting into the service conduit liner a shaft with a cutting tool on the end thereof;
   centering said shaft within said service conduit liner;
   rotating said shaft thereby rotating said cutting tool;
   reciprocating said shaft and cutting tool within said service conduit liner thereby cutting a port through said thermosetting plastic and the wall of said main conduit liner;
   inserting a swab having a dispensing surface substantially conforming to said port connecting said service conduit liner to said main conduit liner into said service conduit liner;
   dispensing a sealing material from the periphery of said swab; and
   reciprocating said swab within the area of intersection between said service conduit liner and said main conduit liner to coat the walls of said port with said sealing material.

8. In a method for connecting subsurface relined intersecting service and main conduits at a remote location without excavating the intersection, having the steps of:
   opening the service and main conduits at points remote from the intersection;
   inserting a main conduit liner in the existing main conduit;
   inserting a service liner into the existing service conduit until the service liner is adjacent said main conduit liner;
   filling the space between said main conduit liner and said existing main adjacent the area of intersection of said service and main conduits with a setting material; and
   forming a port through said setting material and said main conduit liner to connect said service liner and said main conduit liner whereby materials flowing through said service liner may pass into said main conduit liner;
   the improvement wherein the filling step comprises:
   inserting a dispenser through said service conduit to a point adjacent to the area of intersection of said service and main conduits;
   inserting a seal through said service conduit to a point adjacent to said dispenser to prevent flow through said service conduit in a direction from said dispenser and away from said main conduit;
   dispensing said sealant material from said dispenser into the space between said main conduit and said cavity adjacent the area of intersection of said service and main conduits.

9. The method of claim 8 wherein the filling step further comprises:

filling the area between the end of said service liner and said main conduit liner with said setting material.

10. A method of relining a subsurface intersecting main and service conduit system, comprising:
opening said main conduit at two points spaced away from the intersection;
inserting a conduit liner into said main at one of said openings;
drawing said conduit liner through said main conduit to the other of said openings;
opening said service conduit at a point remote from said intersection;
inserting a dispenser through said service conduit to a point adjacent the area of intersection of said service and main conduits;
inserting a seal through said service conduit to a point adjacent to said dispenser to prevent flow from said dispenser in a direction from said dispenser and away from said main conduit;
dispensing a setting material from said dispenser to fill the space between said main conduit and said main conduit liner adjacent the area of intersection of said service and main conduits; and
forming a port in the wall of said main conduit liner whereby said service conduit is connected to said main conduit liner.

11. The method of claim 10 wherein the port forming step includes:
inserting into the service conduit a shaft with a cutting tool on the end thereof;
centering the shaft within said service conduit;
rotating said shaft thereby rotating said cutting tool; and
reciprocating said shaft and cutting tool within said service conduit thereby cutting an opening through said setting material and the wall of said main liner.

* * * * *